R. S. BACON.
DEVICE FOR CLEANING CARRIAGE WHEELS.

No. 185,660. Patented Dec. 26, 1876.

Witnesses.
H. H. Warren
W. Green

Inventor.
R. S. Bacon
by Ridout Third Co
Atty.

THE GRAPHIC CO. N.Y.

UNITED STATES PATENT OFFICE.

REUBEN S. BACON, OF OAKVILLE, ONTARIO, CANADA.

IMPROVEMENT IN DEVICES FOR CLEANING CARRIAGE-WHEELS.

Specification forming part of Letters Patent No. 185,660, dated December 26, 1876; application filed May 22, 1876.

*To all whom it may concern:*

Be it known that I, REUBEN SIMEON BACON, of the town of Oakville, in the county of Halton, in the Province of Ontario, Canada, manufacturer, have invented a certain new and useful Machine for Cleaning the Wheels of Road-Vehicles; and I do hereby declare that the following is a full, clear, and exact description of the same, reference being had to the annexed drawings, and to the letters of reference marked thereon, and forming a part of this specification.

My invention has relation more particularly to an attachment to be secured to the axle or other convenient portion of the vehicle in an adjustable manner, and provided with a reversible head, to the opposite sides of which a brush and scraper, respectively, are attached, and applied at pleasure to the periphery of the wheels.

Figure 1:
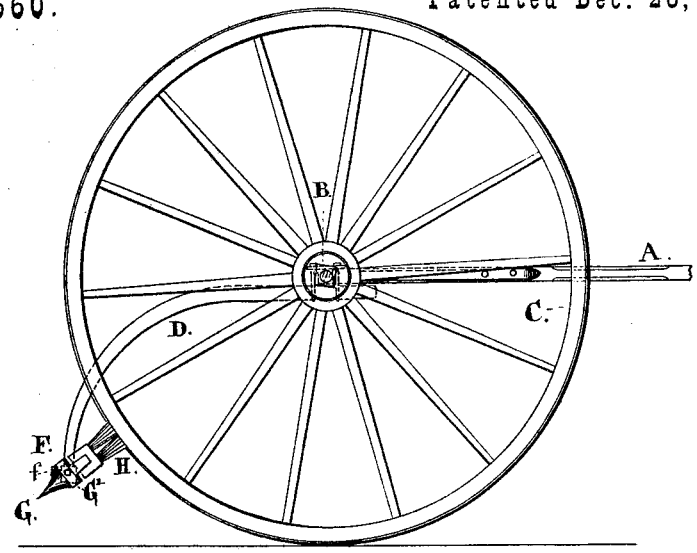
Figure 2:
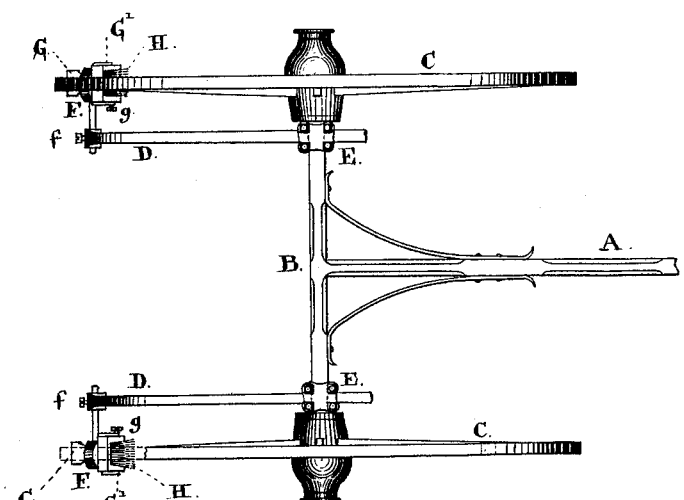
Figure 3:
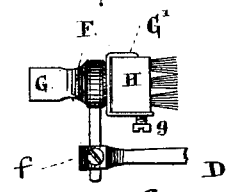

In the accompanying drawings, Figure 1 is a side view of the wheel of a vehicle, to which my attachment is shown as applied. Fig. 2 is a plan of the same, and Fig. 3 a detail of the reversible head.

A is the frame of a light road-vehicle of the ordinary construction, to which the axle B is attached in any of the usual ways. C C are the wheels. D D are downwardly-curved bars attached to the axle in a position adjacent to the inner face of the hubs by the clamping-irons E E. The bars D D taper gradually from the center, and project beyond the wheels a suitable distance, the outer end being enlarged to receive the cylindrical shank of the heads F F. The heads are thus made reversible, and may be secured at any angle with the bars by the set-screws $f f$. One side of the head is provided with a scraper, G, and the opposite side is provided with a clamp, G', with set-screw $g$, within which clamp the detachable brush H is secured.

The brushes and scrapers may be arranged to apply to the face of the tire only, or they may be constructed with side projections, adapted to apply themselves to the edges of the tire and felly in addition.

As the brushes wear short they may be advanced by moving them forward in the clamps G' G', or by loosening the clamping-irons E E and drawing the head closer to the wheel.

The shanks of the heads are made sufficiently long to allow of adjustment laterally to suit the gage of the vehicle.

I claim as my invention and desire to secure by Letters Patent—

A scraping and cleaning attachment for the wheels of road-vehicles, consisting of a bar, D, attached to the axle, frame, or body of the car in an adjustable manner, and having a reversible head, F, provided with a detachable brush, H, and a scraper, G, arranged and operating substantially as described.

R. S. BACON.

Witnesses:
GEO. A. AIRD,
H. H. WARREN.